United States Patent
Cademartiri et al.

(10) Patent No.: US 11,197,435 B2
(45) Date of Patent: Dec. 14, 2021

(54) HYDROGEL-BASED TRANSPARENT SOILS FOR PLANT GROWTH AND IN VIVO ROOT PHENOTYPING

(71) Applicant: Iowa State University Research Foundation, Inc., Ames, IA (US)

(72) Inventors: Ludovico Cademartiri, Ames, IA (US); Lin Ma, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 602 days.

(21) Appl. No.: 16/107,512

(22) Filed: Aug. 21, 2018

(65) Prior Publication Data

US 2019/0150379 A1     May 23, 2019

Related U.S. Application Data

(60) Provisional application No. 62/587,583, filed on Nov. 17, 2017.

(51) Int. Cl.
| | |
|---|---|
| *A01G 24/35* | (2018.01) |
| *G01N 21/01* | (2006.01) |
| *G01N 21/35* | (2014.01) |
| *C08B 37/00* | (2006.01) |
| *C08L 5/04* | (2006.01) |
| *G01N 21/84* | (2006.01) |

(52) U.S. Cl.
CPC ............ *A01G 24/35* (2018.02); *C08B 37/006* (2013.01); *C08B 37/0084* (2013.01); *C08L 5/04* (2013.01); *G01N 21/01* (2013.01); *G01N 21/35* (2013.01); *C08L 2312/00* (2013.01); *G01N 2021/0106* (2013.01); *G01N 2021/8466* (2013.01)

(58) Field of Classification Search
CPC ........ A01G 24/35; A01G 24/30; A01G 31/00; A01G 24/00; A01G 24/44; A01G 24/46; A01H 4/001; C08B 37/006; C08B 37/0084; C08L 5/04; G01N 2021/0106; G01N 21/01; G01N 21/35; G01N 2021/8466

See application file for complete search history.

(56) References Cited

U.S. PATENT DOCUMENTS

| | | | |
|---|---|---|---|
| 3,900,378 A | * | 8/1975 | Yen .................. A61L 15/18 522/72 |
| 6,615,539 B1 | * | 9/2003 | Obonai .................. A01G 24/44 47/62 N |
| 9,090,868 B2 | | 7/2015 | Mace et al. |

(Continued)

OTHER PUBLICATIONS

Bashan et al., "Alginate microbeads as inoculant carriers for plant growth-promoting bacteria", Biol Fertil Soils, vol. 35, pp. 359-368, 2002.

(Continued)

*Primary Examiner* — Trinh T Nguyen
(74) *Attorney, Agent, or Firm* — McKee, Voorhees & Sease, PLC

(57) ABSTRACT

The described invention is directed to hydrogel-based transparent soils that can provide heterogeneous, aeration, and porous condition for plant growth. The hydrogel beads are highly tailorable in size and porosity providing an environment that is closer to natural soil. Index-matching allows the beads to appear transparent, facilitating the use of imaging and microscopy of the plant root system in vivo.

29 Claims, 13 Drawing Sheets
(9 of 13 Drawing Sheet(s) Filed in Color)

(56) References Cited

U.S. PATENT DOCUMENTS

| | | | |
|---|---|---|---|
| 9,578,797 B2* | 2/2017 | Deppermann | A01G 7/00 |
| 2006/0207172 A1 | 9/2006 | McDonald et al. | |
| 2007/0044528 A1* | 3/2007 | Kitchen | C05G 5/40 |
| | | | 71/28 |
| 2017/0027117 A1* | 2/2017 | Parsonage | A01G 24/00 |
| 2017/0196175 A1* | 7/2017 | Shani | A01N 51/00 |
| 2020/0267914 A1* | 8/2020 | Shani | A01G 24/35 |
| 2021/0037723 A1* | 2/2021 | Zhang | B01J 20/267 |
| 2021/0040272 A1* | 2/2021 | Brakin | C08K 3/30 |

OTHER PUBLICATIONS

Hargreaves et al., "Measuring root traits in barley (*Hordeum vulgare* ssp. *vulgare* and ssp. *spontaneum*) seedlings using gel chambers, soil sacs and X-ray microtomography", Plant Soil, vol. 316, pp. 285-297, 2009.

Iyer-Pascuzzi et al., "Imaging and Analysis Platform for Automatic Phenotyping and Trait Ranking of Plant Root Systems", Plant Physiology, vol. 152, pp. 1148-1157, Mar. 2010.

Downie et al., "Transparent Soil For Imaging the Rhizosphere", PLOS ONE, vol. 7, Issue 9, 6 pages, Sep. 2012.

Dombi et al., "Testing a Transparent Hydrophilic Copolymer as a Suitable Soil for the Observation and Study of Plant Root Growth", SMARTER, Project 3, pp. 3-4 of 8, 2013.

\* cited by examiner

HYDROGEL-BASED TRANSPARENT SOILS FOR PLANT GROWTH AND IN VIVO ROOT PHENOTYPING

CROSS-REFERENCE TO RELATED APPLICATIONS

This application claims priority to provisional application U.S. Ser. No. 62/587,583, filed Nov. 17, 2017, which is incorporated herein by reference in its entirety.

GRANT REFERENCE

This invention was made with government support under Grant No. 2017-67007-25946, awarded by USDA/NIFA. The government has certain rights in the invention.

FIELD OF THE INVENTION

The present invention relates to a transparent soil for plant growth. In particular, the invention relates to a hydrogel-based transparent soil providing the porosity and aeration that are characteristic of natural soil and methods of generating and using the same.

BACKGROUND OF THE INVENTION

Increasing the ability of crops to tolerate stresses and to perform on marginal soils is an essential step in securing our food supply. Addressing this challenge requires an understanding of how genotype and environment (both abiotic and biotic) affect root development. Root phenotyping is necessary to pursue this understanding, but is complicated by an apparently necessary compromise: media that mimic field conditions (e.g., soil, sand) are opaque to most forms of radiation, and media that are transparent (e.g., hydroponics, aeroponics, gels) do not provide field-relevant phenotypes and growing conditions. Phenotyping approaches that try to circumvent this compromise (e.g., shovelomics, X-ray tomography) have low throughput, compromise the plant, are incompatible with microscopy, or miss the smallest roots (which often account for a significant fraction of the root volume).

Non-invasive, non-destructive imaging of root systems in physiologically porous media such as soil is a notoriously difficult problem due to the scattering of radiation by interfaces. A promising route to create a "transparent soil" makes use of Fresnel equations. In the absence of absorption, granular materials are opaque because of the scattering of light at interfaces. The Fresnel equations state that the angle of refraction formed at the interface between two materials decreases with the difference between their refractive indices. If the two materials have the same refractive index (i.e., they are "index-matched"), light crosses the interface without being deflected, therefore eliminating the source of the opacity (in the absence of absorption). Index-matching of transparent granular media is often relatively easy to achieve and has been used to model fluid flows.

Using this index-matching approach to create a plant growth medium is a much more difficult problem because of additional constraints: the medium must be (i) cheap enough to scale easily to the liter scale, (ii) non-toxic to plants, (iii) transparent in commonly used nutrient solutions to enable root phenotyping in vivo, (iv) sturdy enough to support a 10-20-cm-high column of itself without collapsing, (v) transparent enough to allow for imaging across a 10-20-cm-wide root system, (vi) a known and constant source of water and nutrition to the growing plant for days, (vii) not change significantly in optical and mechanical properties during the growth of the plant. These challenges are part of the reason why, to this day, the plant science and agronomy communities do not have a viable solution for transparent soil. An example of this approach that worked for the growth of plants used grains of Nafion as a medium. Unfortunately, Nafion is very expensive, it must be chemically processed before it can be used to grow plants, it does not absorb water or nutrients (some parts of the root system must be saturated with nutrient solution), and its index-matching solution has significant concentrations of sorbitol, which can cause osmotic stress on plants.

BRIEF SUMMARY OF THE INVENTION

The compositions of the invention provide a highly tailorable transparent soil comprising hydrogel beads that allow for the imaging (by both photography and microscopy) of the whole root system in vivo and provides the porosity and aeration that are characteristic of soil and is physiological for the growth of roots. In this medium, any off-the-shelf digital camera can image the roots without exposing them to biologically active visible radiation. Transparent soil can be used to grow plants in an environment that is closer to natural soil and yet allows for imaging of the root system upon saturation with medium.

The present disclosure provides transparent soils with the porosity and aeration characteristic of a natural soil and methods of making the same. The hydrogel bead formulation is optimized for plant growth. In one embodiment, the cross-linked polymers are present in an amount between about 0.4% to about 1.2% by weight. In one embodiment, the polymer is a microbial exopolysaccharide with chains of two residues of D-glucose, one L-rhamnose, and one D-glucuronic acid. In another embodiment the polysaccharide is gellan and a second polymer is alginate. The cross-linker is a divalent cation such as $Mg^{2+}$. In one embodiment, the gellan gum and the alginate are present at a ratio of about 4 to 1. In one embodiment, the composition is index-matched with an aqueous medium, preferably an aqueous plant growth medium such as Murashige and Skoog (MS) medium. In one embodiment, the transparent soil is transparent under infrared light upon saturation with the aqueous plant growth medium.

The hydrogel beads of the present invention are tailorable in size and porosity. In one embodiment, the hydrogel beads comprising the transparent soil are about 500 μm to about 5.5 mm in size. In one embodiment, the hydrogel beads have an effective porosity from about 0.05 to about 0.3.

In another aspect, the present invention provides methods of making the transparent soils by providing a polymer solution and cross-linker solution and introducing droplets of the polymer solution into the cross-linker solution to form the hydrogel beads. In an exemplary embodiment, the cross-linking solution is an aqueous solution of $MgCl_2$. In one embodiment, the concentration of $MgCl_2$ is from about 5 mmol/L to about 100 mmol/L. In one embodiment, the cross-linker solution is stirred.

In one embodiment, the droplets of polymer solution are dropped through a needle. In one embodiment, needles with inside diameters from about 300 μm to about 2 mm are provided to alter the size of the beads from about 500 μm to about 5.5 mm. In one embodiment, the method further comprises soaking hydrogel beads of the present invention in an index-matching aqueous medium, preferably an aqueous plant growth medium such as Murashige and Skoog (MS) medium.

In another aspect, the invention provides methods of non-destructively imaging the root system of plants grown in the transparent soil. In one embodiment, an index-matching plant growth medium is provided, and the hydrogel beads become optically transparent upon saturation, allowing visualization of the plant root system. In one embodiment, the visualization is carried out with a camera or microscope including a light microscope, a fluorescent microscope, or the like. In one embodiment, the visualizing is in the dark under infrared light and without exposing the roots to biologically active visible radiation.

While multiple embodiments are disclosed, still other embodiments of the present invention will become apparent to those skilled in the art from the following detailed description, which shows and describes illustrative embodiments of the invention. Accordingly, the figures and detailed description are to be regarded as illustrative in nature and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIG. 1A shows the system for making particles. FIG. 1B shows transparent soil before (left) and after (right) saturation with 1×MS medium (top), 0.5×MS medium (middle) and LB medium (bottom). FIG. 1C shows transmittance of 1080 nm infrared through transparent soil with made by different polymer/crosslinker concentrations. The scale also shows the distance in the transparent soil after which 10% of the light in transmitted (left: 0.5 MS; right, 1 MS). FIG. 1D shows the load required to completely collapse the transparent soil as a function of polymer/crosslinker concentrations for 0.5×MS beads (left) and 1×MS beads (right). The scale also reports the height of a transparent soil medium that would cause the bottom layer of beads to fully collapse under the weight. FIG. 1E shows dependence of the size of the beads of transparent soil as a function of the needle size used to drop the polymer solution. FIG. 1F shows the total and effective porosity as a function of the size of the beads. FIG. 1G shows the change in the size of the beads in a transparent soil as a function of time (with and without a plant growing in it). The medium was saturated at day 7 and 14.

FIG. 2A shows time-lapse imaging of *Brassica rapa* roots growing in hydroponics (top) and transparent soil (bottom) from day 6 to day 12 after transplant. FIGS. 2B-2C show root structure and phenotype comparison of *B. rapa* grown in different media. FIGS. 2D-2E show root structure and phenotype comparison of *G. max* grown in different media.

DETAILED DESCRIPTION OF THE INVENTION

Figure 1A:
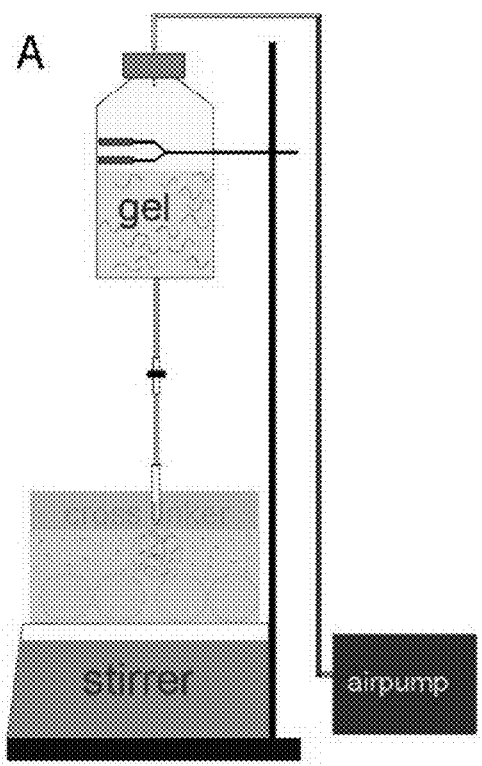
FIGS. 1A-1G show particle making processing and properties.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The singular terms "a", "an", and "the" include plural referents unless context clearly indicates otherwise. Similarly, the word "or" is intended to include "and" unless the context clearly indicate otherwise. The word "or" means any one member of a particular list and also includes any combination of members of that list.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

The term "about," as used herein, refers to variation in the numerical quantity that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The term "about" also encompasses amounts that differ due to different equilibrium conditions for a composition resulting from a particular initial mixture. The term "about" also encompasses these variations. Whether or not modified by the term "about," the claims include equivalents to the quantities.

The term "polymer," as used herein, refers to a molecule consisting of individual monomers joined together. In the context of the present invention, a polymer may comprise monomers that are joined "end-to-end" to form a linear molecule or may comprise monomers that are joined together to form a branched structure. As used herein, the phrase "cross-linked polymer" refers to a network of polymer units being inter-linked via covalent, hydrogen or ionic bonding.

A "hydrogel" as used herein refers to a polymeric material which exhibits the ability to swell in water and to retain a significant portion of water within its structure without dissolution. Hydrogels are typically three dimensional macromolecular networks in water formed from a cross-linked polymer. Hydrogels useful in the invention can be derived from natural materials or synthetic materials.

Representative natural polymers include alginate, collagen, chitosan, dextran, gelatin, cellulose, agarose, pectin, starch, gellan, hyaluronic acid, xanthan, and agaropectin. Representative synthetic polymers include poly(hydroxy acids) such as poly(lactic acid), poly(glycolic acid), and poly(lactic acid-co-glycolic acid), poly(lactide), poly(glycolide), poly(lactide-co-glycolide), polyanhydrides, polyorthoesters, polyamides, polycarbonates, polyalkylenes such as polyethylene and polypropylene, polyalkylene glycols such as poly(ethylene glycol), polyalkylene oxides such as poly(ethylene oxide), polyalkylene terepthalates such as poly(ethylene terephthalate), polyvinyl alcohols, polyvinyl ethers, polyvinyl esters, polyvinyl halides such as poly(vinyl chloride), polyvinylpyrrolidone, polysiloxanes, poly(vinyl alcohols), poly(vinyl acetate), polystyrene, polyurethanes and copolymers thereof, derivativized celluloses such as alkyl cellulose, hydroxyalkyl celluloses, cellulose ethers, cellulose esters, nitro celluloses, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, and cellulose sulfate sodium salt, polymers of acrylic acid, methacrylic acid or copolymers or derivatives thereof including esters, poly(methyl methacrylate), poly(ethyl methacrylate), poly(butylmethacrylate), poly(isobutyl methacrylate), poly(hexylmethacrylate), poly(isodecyl methacrylate), poly(lauryl methacrylate), poly(phenyl methacrylate), poly(methyl acrylate), poly(isopropyl acrylate), poly(isobutyl acrylate), and poly(octadecyl acrylate), poly(butyric acid), poly(valeric acid), and poly(lactide-co-caprolactone), copolymers and blends thereof. In an exemplary embodiment, the hydrogel beads comprise the polymers gellan gum and alginate. In a preferred embodiment, the ratio of gellan gum to alginate is about 4 to 1.

As used herein, the term "alginate" refers to the anionic polysaccharide distributed widely in the cell walls of brown algae (e.g., *Laminaria hyperborea, L. digitata, Eclonia maxima, Macrocystis pyrifera, Lessonia nigrescens, Ascophyllum nodosum, L. japonica, Durvillaea antarctica,* and *D. potatorum*) and which includes β-D-mannuronic (M) and α-L-guluronic acid (G) residues in varying proportions. Alginate forms water-soluble salts with alkali metals, such as sodium, potassium, lithium, magnesium, ammonium, and the substituted ammonium cations derived from lower amines, such as methyl amine, ethanol amine, diethanol amine, and triethanol amine. The term "alginate" as used herein encompasses all forms of alginate known to those of skill in the art including, without limitation, calcium alginate, sodium alginate, propylene-glycol alginate, and potassium alginate. Additionally, the term "alginate" as used herein encompasses all terms used by those of skill in the art to describe alginate, e.g., alginic acid and algin.

"Gellan gum", as used herein, refers to the extracellular polysaccharide obtained by the aerobic fermentation of the microorganism *Sphingomonas elodea* in a suitable nutrient medium. Various forms of gellan gum have been described in the art and may be used in the present invention.

Gellan gum and alginate polymers can be readily cross-linked by reacting with divalent cations. Cross linking of the polymer of the present invention can be effected via divalent cations such as, but not limited to, barium, calcium, magnesium, manganese, or zinc. Most preferably, the cross linking is effected via magnesium cations. Magnesium is a macronutrient for plants and will not form a precipitate with sulfate when mixed with aqueous plant growth media. The certain embodiments, cross linker solution is a $MgCl_2$ solution. In an embodiment of the invention, the $MgCl_2$ concertation is about 5 mmol/L to about 100 mmol/L. Therefore, in some embodiments, the $MgCl_2$ cross linker solution is about 5, 10, 20, 50, or 100 mmol/L.

In an embodiment of the invention the water content of the hydrogel composition is at least 95% by weight of the composition, more preferably at least 97% by weight of the composition. In an embodiment of the invention the water content is above 98% by weight of the composition, more preferably in the range 98.5-99.8% by weight of the composition, such as in the range 98.8-99.6% by weight of the composition.

In an embodiment of the invention the polymer content of the hydrogel composition is about 0.1% to about 5% by weight of the composition, more preferably about 0.4% to about 1.2% by weight of the composition. Therefore, in some embodiments, polymer content of the hydrogel composition is about 0.4%, 0.5%, 0.6%, 0.7%, 0.8%, 0.9%, 1.0%, 1.1%, or 1.2% by weight of the composition. When the concentration is too low, no beads can form because of the low viscosity. When the concentration too high, the beads are too opaque.

The term "beads", as used herein, refers to particles, granules, spheroids, or pellets. The dimensions of a hydrogel bead of the disclosure are substantially similar to the droplet from which it was formed. In certain embodiments, the hydrogel beads have a size of from about 500 μm to about 5.5 mm. Therefore, in some embodiments, the size of the hydrogel bead is about 500, 600, 800, or less than 1000 μm. In some embodiments, the size of the hydrogel bead is about 1, 2, 2.5, 3, 4, 5, or 5.5 mm.

The term "needle" as used herein has no limitation other than it refer to an object that substances may pass through. The size of a resulting hydrogel bead may be modified by adjusting the inside diameter of the needle.

The term "effective porosity", as used herein, refers to the difference between total pore volume and pore volume accessible by water. The size of the beads affects the effective porosity. In one embodiment, transparent soils with effective porosities ranging from about 0.05 to about 0.3 are generated by controlling the bead size. Therefore, in some embodiments, effective porosity of the transparent soil is about 0.05, 0.1, 0.15, 0.2, 0.25, or 0.3. The porosity of the beads is calculated as pore volume/total volume×100%. Beads of a known actual volume are put into a volume bottle and water is added from the top. When the water level reaches the top of beads, the volume of added water is recorded as effective pore volume. After stirring the system slightly, more water is added until the water level reaches the top of beads again. The total volume of added water is recorded as total pore volume.

The hydrogel beads can be index-matched to an aqueous medium that is used for plant growth. The term "plant growth medium", as used herein refers to an aqueous solution designed to support the growth of plants such as Murashige and Skoog (MS) medium. Hydrogel beads that are index-matched allows the beads to appear transparent, which facilitates the use of imaging and microscopy of the plant root system in vivo.

EXAMPLES

Example 1: Particle Processing and Properties

The medium is composed of beads of hydrogel produced by dropping a solution of polymer into a stirred bath of crosslinker solution. The polymer solution is a mix of sodium alginate and gellan gum (a microbial exopolysaccharide produced by *Sphingomonas elodea*, and consisting of chains of two residues of D-glucose, one L-rhamnose, and one D-glucuronic acid). Both of these polymers produce gels that are widely used for the growth of plants and other organisms and are relatively inexpensive. For the same concentrations of polymers and crosslinker, agar crosslinks faster, but has a higher refractive index, it is colored, and produces relatively weak gels, while gellan gum is colorless, it has a higher transparency, a lower refractive index, and a much higher strength, but crosslinks slowly. The compositing of these polymers allows for the formation of hydrogel beads with sufficient mechanical strength and transparency to serve as a "transparent soil" (TS), and with a sufficiently rapid gelation kinetics to enable the formation of beads at the very low gel concentrations necessary for transparency (as low as 0.4 wt %).

$MgCl_2$ was chosen as a crosslinker. As most divalent cations, Mg is a very strong crosslinker for agar and gellan gum. Like Ca, it is a macronutrient for plants. Nonetheless, it has a smaller impact on the refractive index of the gel due to a lower polarizability, and it will not precipitate as sulfate when mixed with plant growth medium (e.g., Murashige-Skoog, MS) due to its much higher solubility product.

Figure 1B:
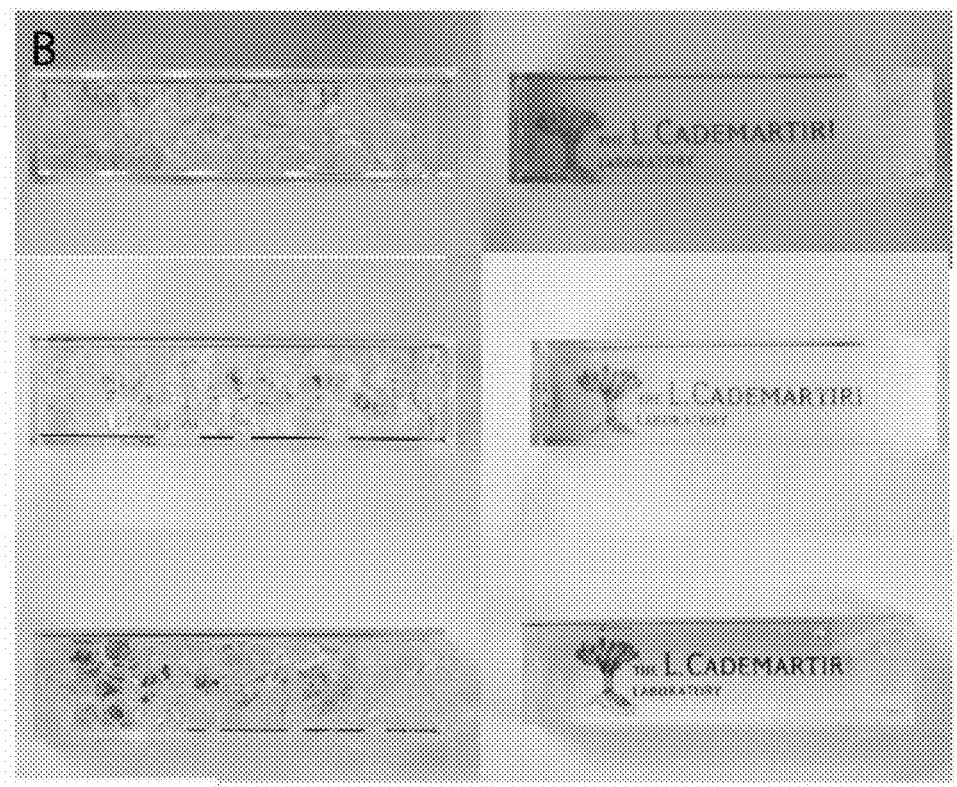

The packed hydrogel beads create a bicontinuous porous medium that becomes optically transparent upon saturation with plant growth medium. FIG. 1B shows the difference in appearance between the drained TS and the saturated TS in MS medium at full concentration (1 MS) and half concentration (0.5 MS).

The transmittance of the gel will depend on the wavelength in part due to the Tyndall effect. Therefore, there is a significant advantage in using the near-infrared (NIR) range of electromagnetic radiation for imaging. There are two further reasons to do so: (i) NIR imaging (at least up to the bandgap energy of Si: 1.1 eV or 1127 nm) can be performed with any digital camera after removing the filter in front of the Si sensor; (ii) NIR imaging can be performed in the "dark", thereby preventing the exposure of the root system to biological active visible radiation.

Figure 1C:
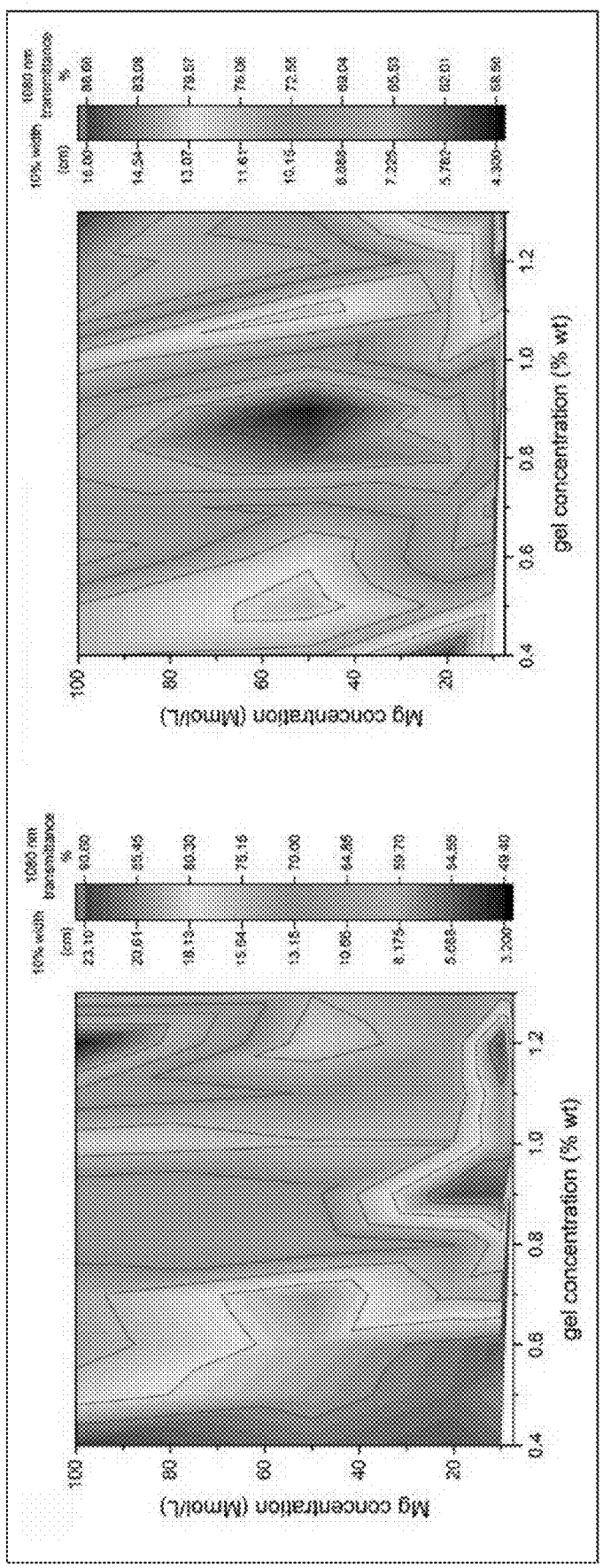
Figure 1D:
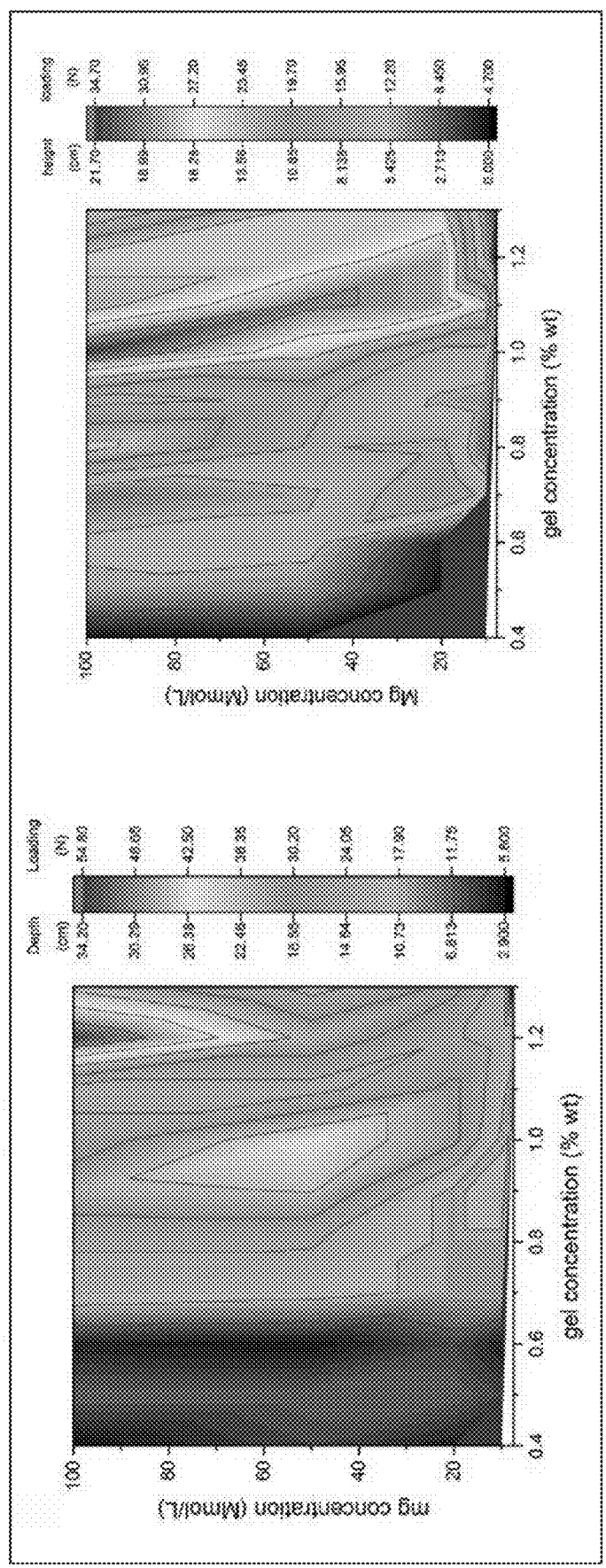

The concentrations of the polymer and crosslinker solutions modify both the transparency of the TS as well as its mechanical strength. FIG. 1C shows a colormap plot of the transmittance of the TS at 1080 nm in 0.5 MS (left) and 1 MS (right) medium, as a function of gel concentration (from 0.4 wt. % to 1.3 wt. %) and Mg concentration (from 8 mmol/l to 100 mmol/l). Along with the transmittance, the colormap reports the optical distances in TS after which transmittance has decreased to 10% of the incident intensity. This benchmark allows a rapid estimation of the lateral dimensions of the root environment that can be phenotyped in this TS. As shown in the plot it is possible to create TS that enables the phenotyping of root systems wider than 20 cm. FIG. 1D shows a comparable colormap plot of the mechanical properties of the TS quantified as the pressure required to completely collapse the voids between the particles. The colormap also reports how this measure corresponds to the maximum height of TS that can be used before the bottommost layer of beads collapses completely. As shown by the map it is quite easy to find gel compositions that allow for the phenotyping of root systems as deep as 30 cm.

While the overall trends for both transmittance and strength are intuitive (e.g., low crosslinker and polymer concentrations lead to highly transparent but weak gels while high crosslinker and polymer concentrations lead to opaque but strong gels), the details are not. The fine structure of the plot is not a result of sample to sample variability which is only significantly dependent on the purity of the polymer solution (some alginate batches contain significant amounts of Ca due to their specific processing).

Figure 1E:
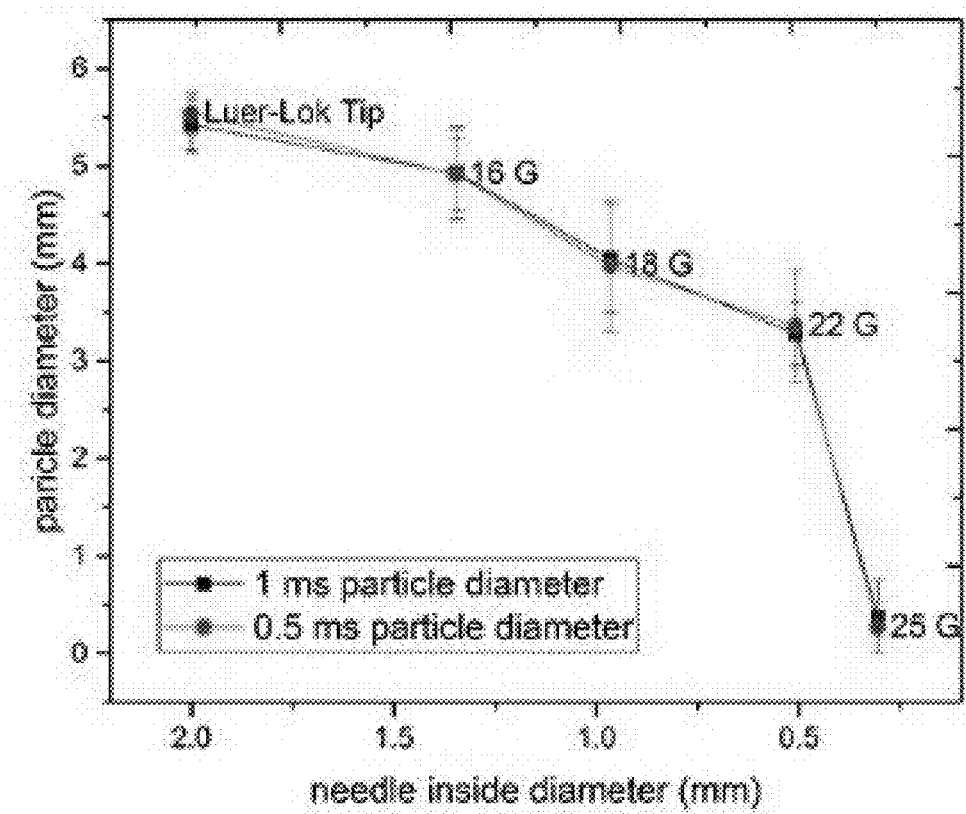
Figure 1F:
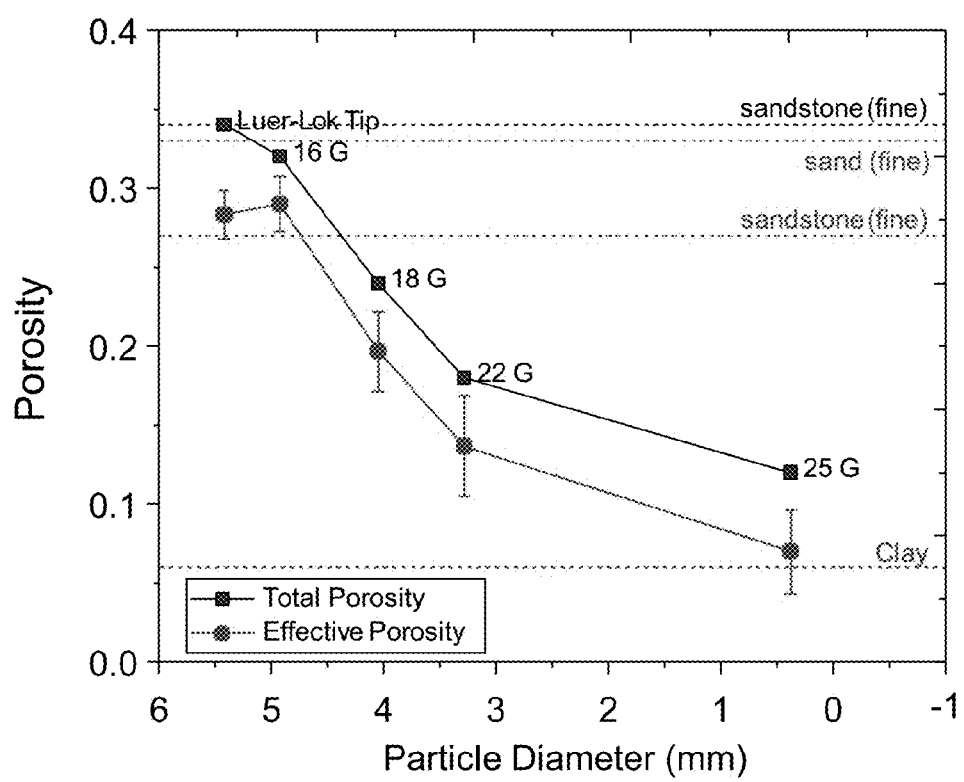

To accurately mimic soil, it is important to control porosity and particle size. The size of the TS beads can be controlled quite broadly (between 500 µm and 5.5 mm) by the inside diameter of the needle (between 300 µm and 2 mm) used to create the droplets (cf. FIG. 1e). Because of the formation of liquid menisci between the beads, the size of the beads affects the pore volume of the TS and the difference between total pore volume and pore volume accessible by water (also called "effective porosity"). FIG. 1f shows the total and effective pore volume of the TS as a function of the size of the beads, and compared to the effective pore volume of different soil types. Remarkably, by controlling the bead size we can generate effective porosities that span the gamut between those of clay (0.06) and fine sandstone (0.27).

Figure 1G:
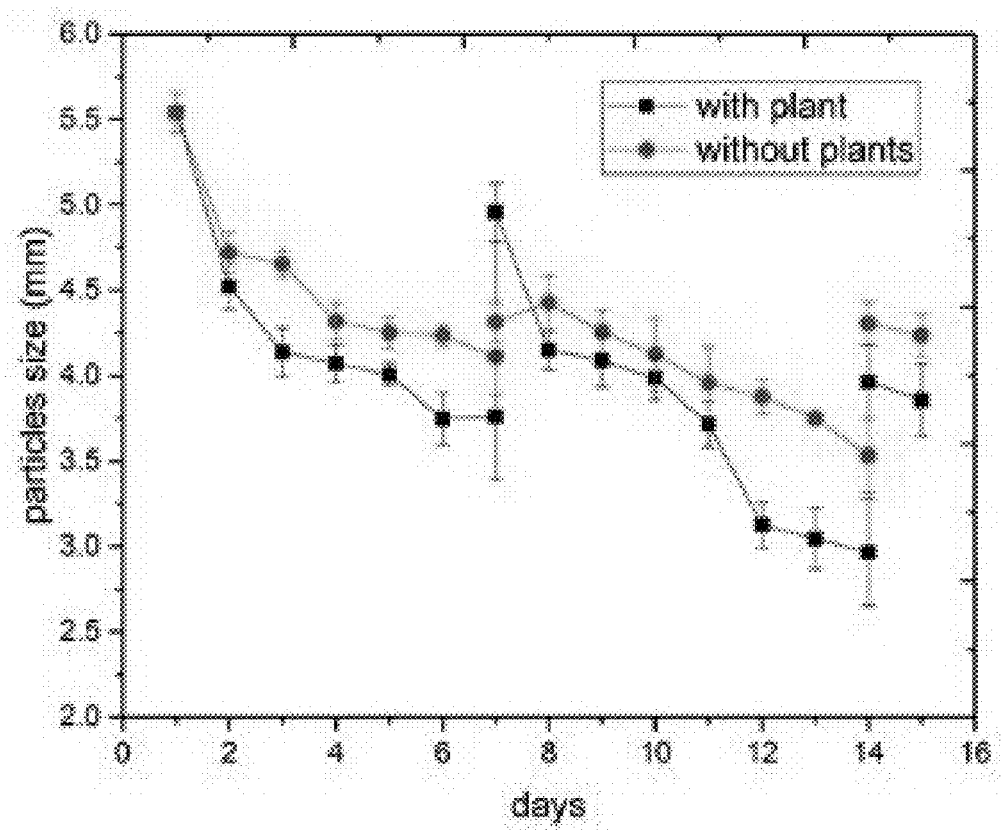

The size of the beads does not stay exactly constant over several days for two reasons: (i) gel reconstructs due to the non-covalent crosslinks, and (ii) roots will uptake water and nutrients (and potentially Mg) and potentially exudate ions that could compete with the Mg crosslinks. Nonetheless, the shrinkage is mostly eliminated when the beads are saturated with growth medium during phenotyping. FIG. 1G shows the evolution of the size of the beads over the course of 15 days, both with (black) and without (red) a plant (*Brassica rapa*) growing in it. In both cases we see that the beads decrease in size, with the plant causing an additional loss in volume. The shrinkage is partially reversible by saturating the TS with fresh nutrient solution, as shown at day 7 and 14. After 7 d, the size increased from 3.75 mm to 5.0 mm, which is close to the original size (5.5 mm).

Example 2: Plants Grown in Transparent Soil

Figure 2A:
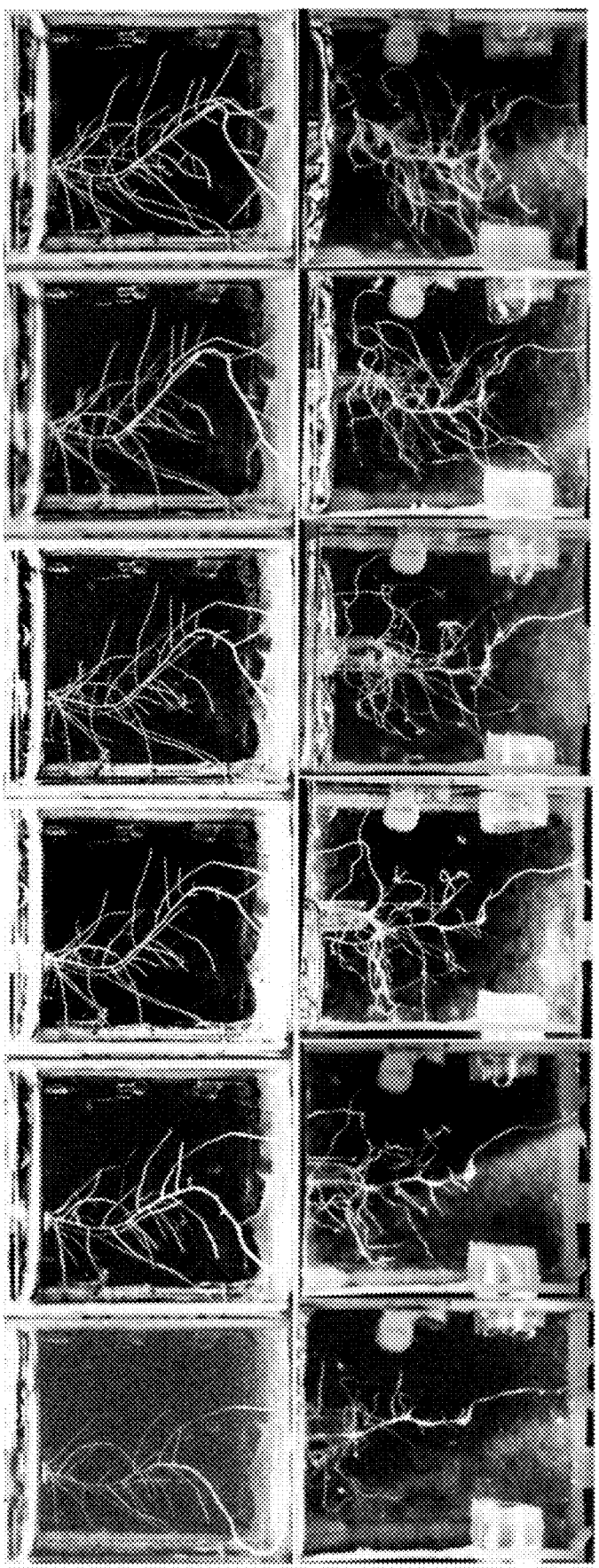
FIGS. 2A-2E show plants grown in transparent soil.

Growing plants in the transparent soil allows for in situ, in vivo imaging of the root system over days of growth, similarly to what is routinely possible in hydrogels. FIG. 2A shows two timelapse images of the growth of *B. rapa* in continuous gel (top) and transparent soil (bottom), from day 6 to day 12 after transplant. While in both cases the plants were imaged in the NIR, the transparent soil was saturated only for the time necessary to phenotype the roots and was then drained of the excess liquid.

Figure 2B:
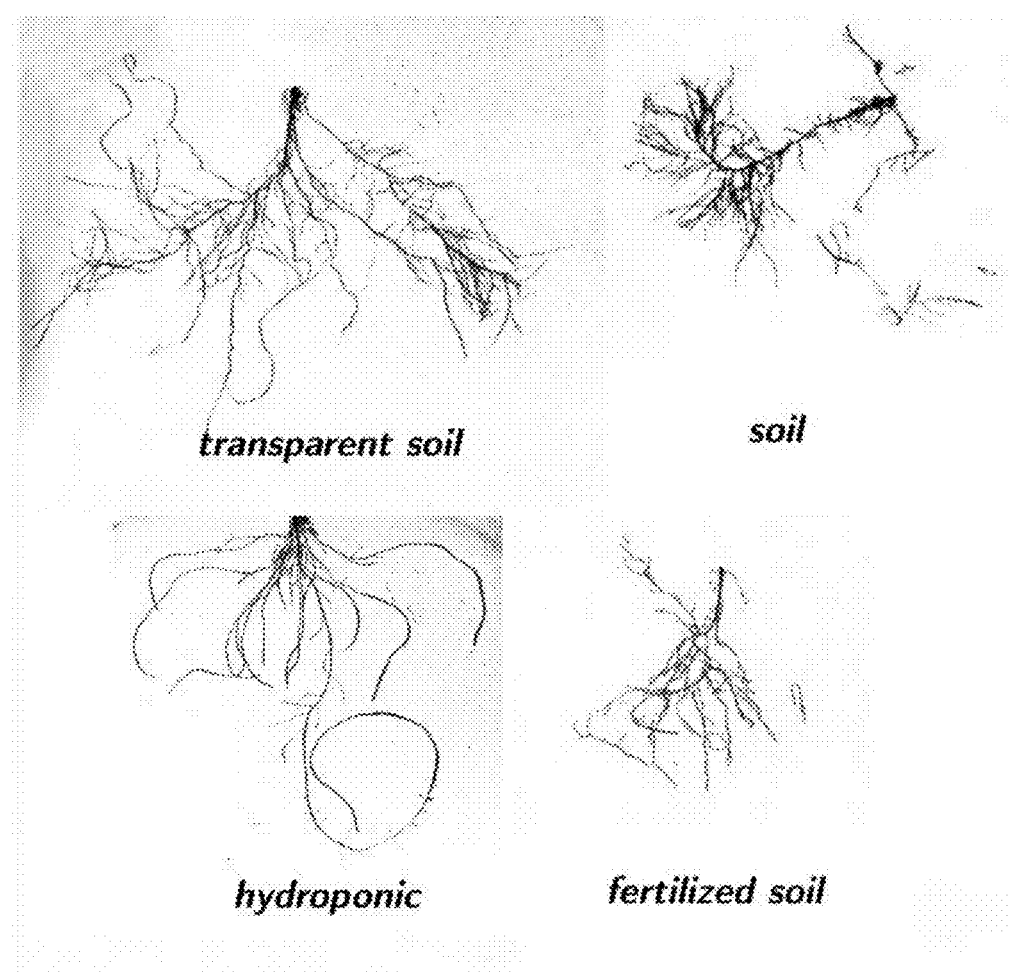
Figure 2C:
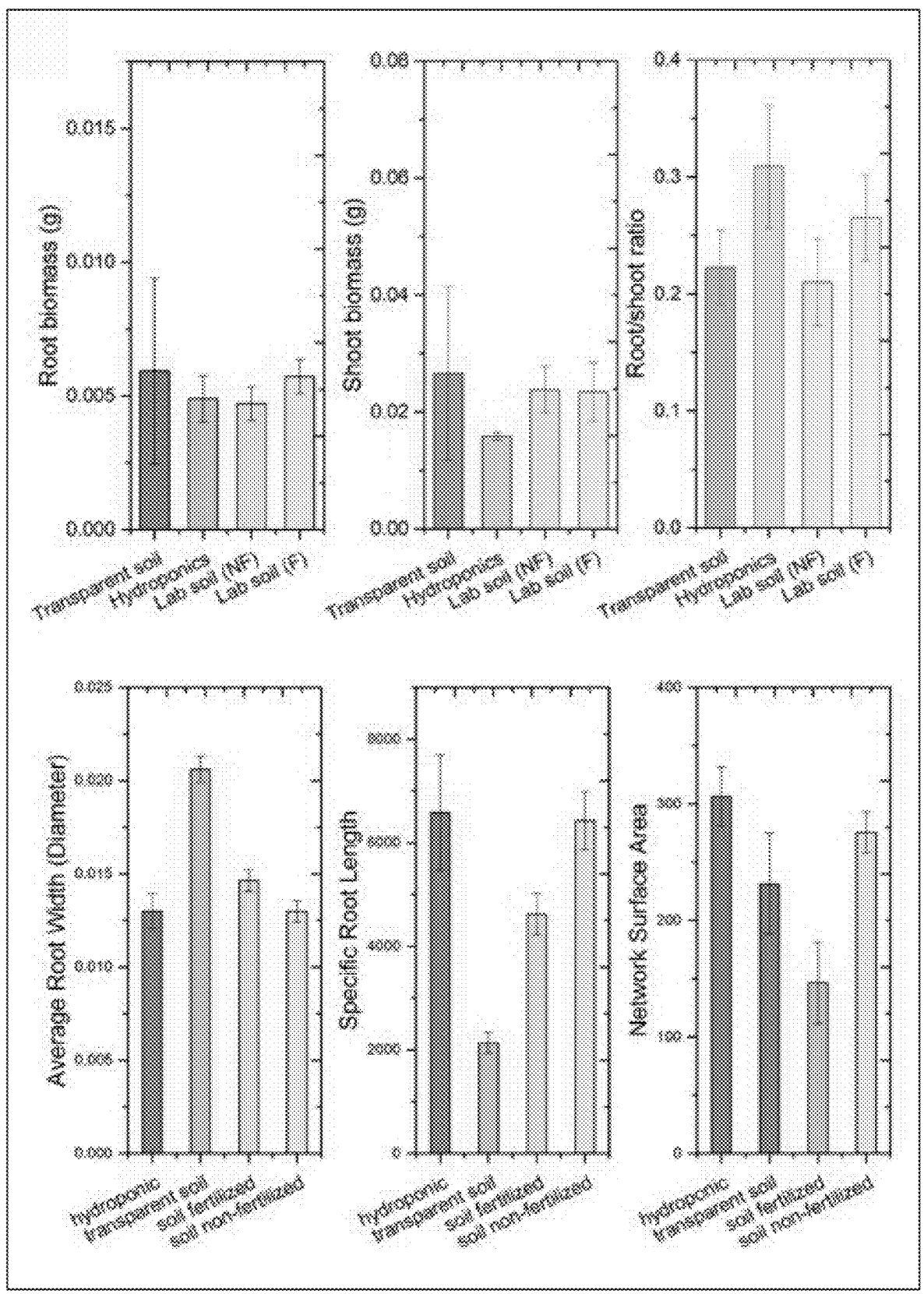
Figure 2D:
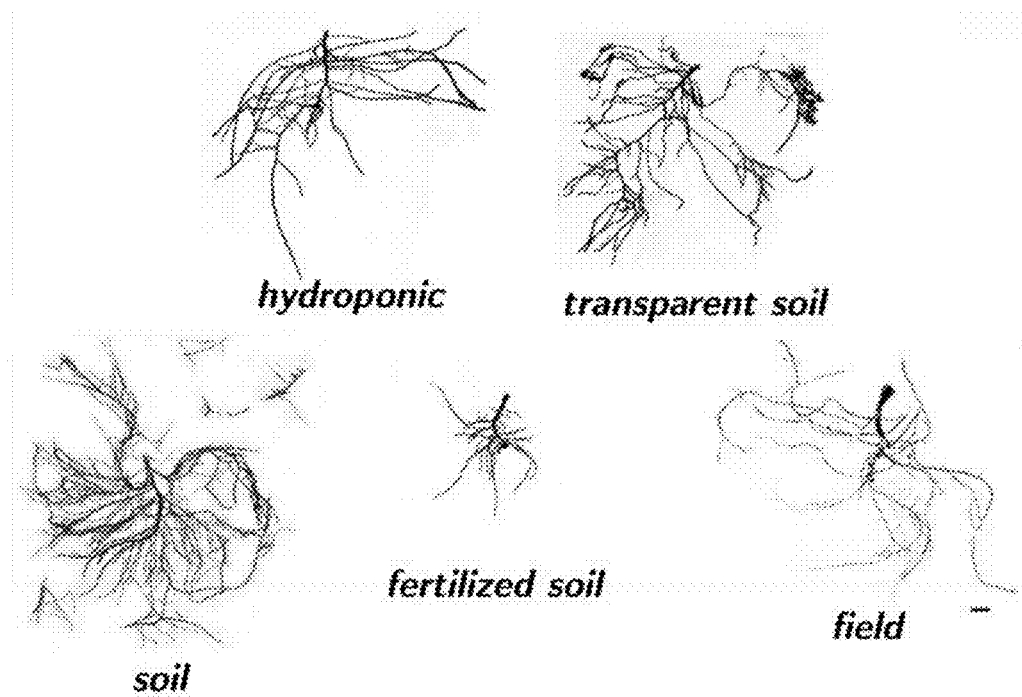
Figure 2E:
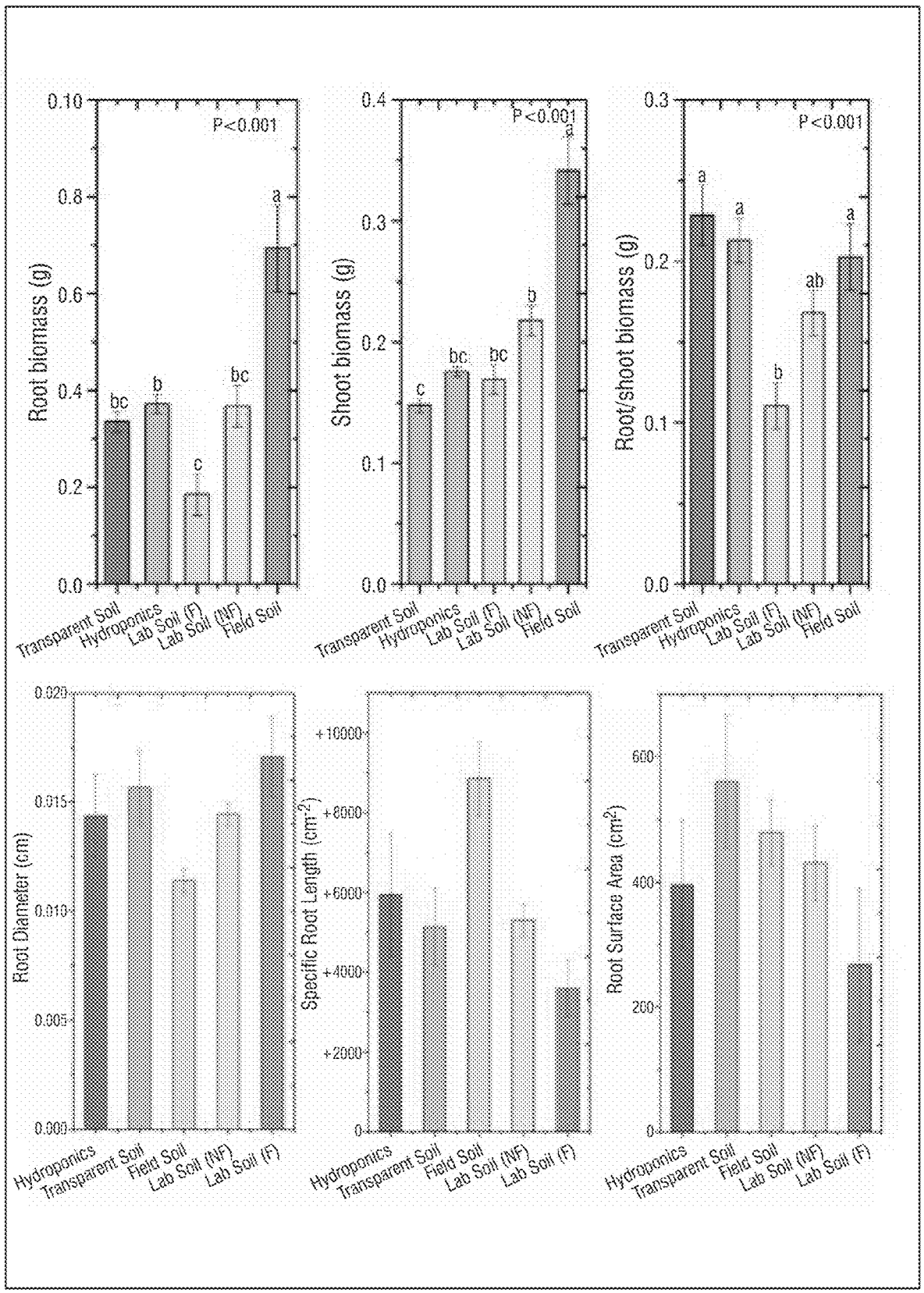

FIG. 2B shows the comparison of representative root phenotypes for *B. rapa* plants grown in hydroponics, transparent soil, fertilized soil, and non-fertilized soil. The soil was obtained from the ISU Research Farm. Fertilization of the soil was accomplished by adding to the soil the same amounts of salts that were included in the hydroponics and transparent soil tests. The images show that hydroponic root systems are significantly different from the other media, and that transparent soil phenotype is more similar to the soil phenotypes than to the hydroponic phenotype. FIG. 2C shows quantitative phenotypes (biomass, network surface area, specific root length) of the root systems. FIG. 2D shows the comparison of representative root phenotypes for *Glycine max* plants grown in hydroponics, transparent soil, fertilized soil, non-fertilized soil, and field conditions. Similar to the case of *B. rapa*, the transparent soil phenotype is significantly more comparable to the soil phenotypes, as shown by the quantitative phenotyping shown in FIG. 2E.

Example 3: Applications of Transparent Soil

Figure 3A:
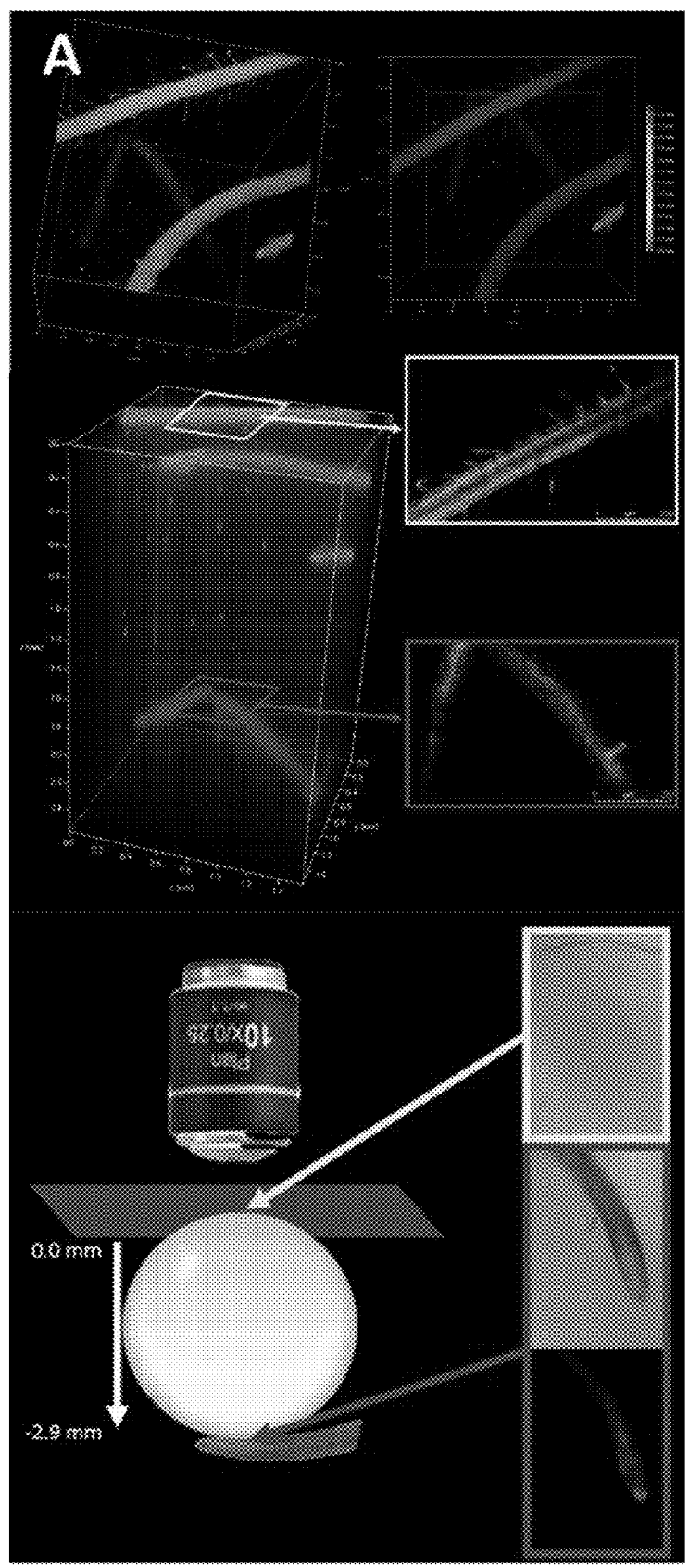
FIG. 3A shows confocal microscopy of *A. thaliana* roots in transparent soil showing the ability to image roots that are behind soil beads.

Beside macroscopic phenotyping, microscopy is essential to visualize cellular-level processes that underlie root development. For the transparent soil to be valuable across the whole spectrum of plant science, it is essential for it to be compatible with the most common microscopy techniques. FIG. 3A shows the in vivo confocal microscopy of roots imaged at different depths within transparent soil. Specifically, the root in the background is located behind a transparent soil bead and yet it can be characterized easily by microscopy with very good resolution.

Figure 3B:
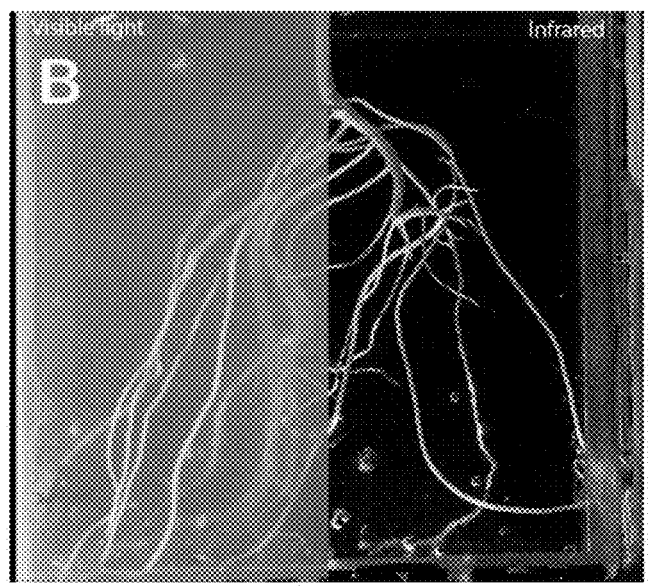
FIG. 3B shows pH-sensing transparent soil showing acidification of the rhizosphere, causing the indicator to switch from violet to yellow in proximity of the root system of a *G. max* plant.

The use of hydrogels for the creation of a transparent soil medium provides a wealth of opportunities for adding sensing capabilities to the medium. FIG. 3B shows the growth of *G. max* roots in a TS medium that had been imbued with a pH indicator (5',5"-dibromo-o-cresolsulfophthalein, bromocresol purple, BCP) that switches from violet to yellow as the pH decreases from 6.8 to 5.5. The visible image shows how the root system creates rapidly an acidic environment in its rhizosphere which is clearly visible in the yellow coloration around the root. The comparison with the infrared imaging allows us to show the significant improvement in transparency that can be obtained by using the NIR spectrum.

Figure 3C:
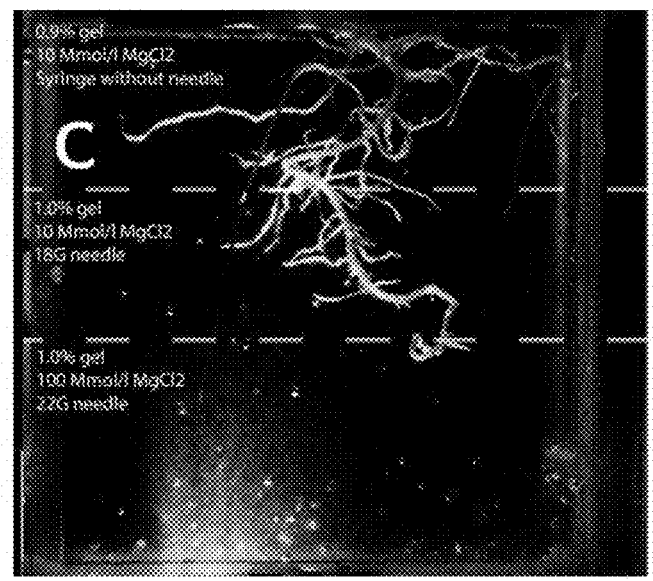
FIG. 3C shows creating mechanical and porosity gradients in transparent soil: photograph shows the response of a *G. max* root system to a layered transparent soil medium (the top is made of 0.9% polymer solution in 10 mmol $L^{-1}$ $MgCl_2$ solution dropped by a syringe without needle, the middle one is made of 1.0% gel in 10 mmol $L^{-1}$ $MgCl_2$ solution dropped through a 18 G needle, and the bottom one is made of 1.0% gel in 100 mmol $L^{-1}$ $MgCl_2$ solution dropped through a 22 G needle).
Figure 3D:
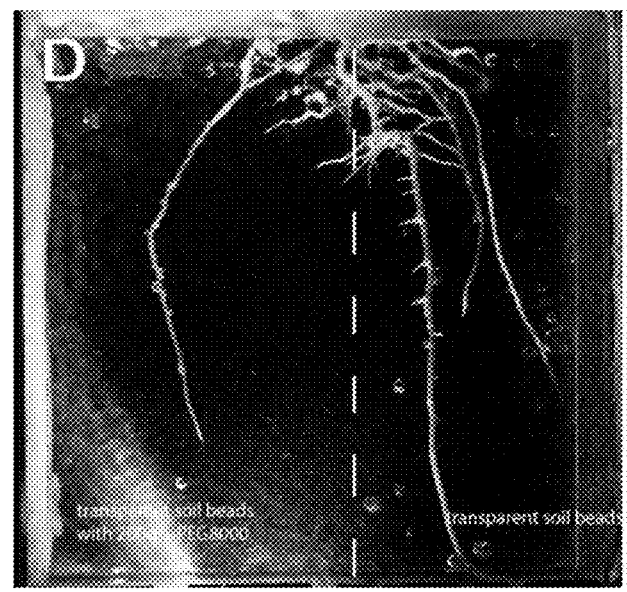
FIG. 3D shows creating water availability gradients in transparent soil: photograph shows a *G. max* root developing across two regions of water availability (low, obtained by soaking beads in 2 MS solution with 200 g $L^{-1}$ PEG8000, and high, without the PEG8000).
Figure 3E:
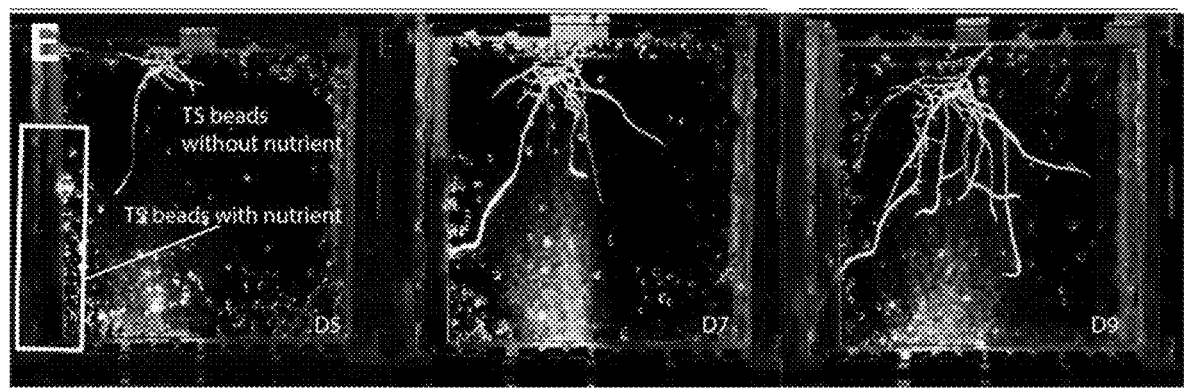
FIG. 3E shows time-lapse imaging of the response of a *G. max* root to a nutrient gradient generated by beads seeded with nutrients in a nutrient depleted medium.

The granular nature of the transparent soil, and the simplicity of its production and customization, facilitate the creation of controlled heterogeneities in the growth environment to look at tropisms of the root system in vivo. FIG. 3C shows the response of a *G. max* root to a gradient in the mechanical properties and porosity of the transparent soil with the topmost layer being the softest and most porous and the bottommost being the hardest and least porous. The dashed lines in the image shows the interfaces between different layers of transparent soil with different concentrations of crosslinker and different particle sizes. The flattening of the root system at the interfaces between different strata of soil is surprisingly significant considering the small differences in mechanical properties between the three layers, and the granular nature of the medium. FIG. 3D shows instead the exposure of *G. max* roots to a gradient in water availability created by infusing the transparent soil on the left side of the container with an osmoticum (polyethylene glycol, MW=8000 g/mol). The root structure appears to respond by confining most of its growth to the right of the container and by showing different degrees of branching in the two halves of the container (nearly no branching in the low availability region of the medium). A different type of tropism is shown in the timelapse in FIG. 3E, whereby a number of beads in the bottom left corner of the container where seeded with a high concentration of nutrient, while the rest of the medium was nutrient depleted. The primary root of the *G. max* root system showed a very significant tropism towards the region of high nutrient concentration.

Example 4: Procedure of Making Transparent Soil

Select gel concentration and crosslinker concentration based on width/depth map (FIGS. 1C and 1D).
Connect 10 mL syringe and needles to particle making system. Control the particle size by removing needles and using different kind of needles.
Drop 200 mL phytagel and alginate solution into 1 L crosslinker solution with 200 rpm stirring (FIG. 1A).
Let the particles crosslink for 10 minutes with 200 rpm stirring.
Beads were collected from crosslinker using a fine mesh sieve. Beads were soaked in 2×MS solution (for particles transparent in 1×MS solution) or 1×MS solution (for particles transparent in 0.5 MS solution) for at least 1 hour. The ratio of soaking solution and beads is 1:1.
Beads were collected from the MS solution by using a fine sieve and dried with paper towels.

What is claimed is:

1. A transparent soil for plant growth with the porosity and aeration characteristic of a natural soil comprising:
a plurality of hydrogel beads comprising water in an amount of more than about 98% by weight; and one or more cross-linked polymers comprising a microbial exopolysaccharide with chains of two residues of D-glucose, one L-rhamnose, and one D-glucuronic acid, wherein the cross-link comprises a divalent cation.

2. The transparent soil of claim 1 wherein said divalent cation is magnesium.

3. The transparent soil of claim 1, wherein said one or more polymers is present in an amount of from about 0.4% to about 1.2% by weight.

4. The transparent soil of claim 1 wherein said exopolysaccharide is produced by *Sphingomonas elodea*.

5. The transparent soil of claim 4 wherein said exopolysaccharide is gellan.

6. The transparent soil of claim 1 wherein said one or more polymers comprises polymer comprises gellan gum and alginate.

7. The transparent soil of claim 6, wherein the ratio of gellan gum to alginate is about 4:1.

8. The transparent soil of claim 1, wherein the transparent soil is index-matched with an aqueous medium of interest.

9. The transparent soil of claim 8, wherein the aqueous medium of interest is a plant growth medium.

10. The transparent soil of claim 1, wherein said hydrogel beads have a size of from about 500 μm to about 5.5 mm.

11. The transparent soil of claim 1, wherein said hydrogel beads have an effective porosity of from about 0.05 to about 0.3.

12. The transparent soil of claim 1, wherein the transparent soil is transparent under infrared light.

13. A method for making a transparent soil for plant growth with the porosity and aeration characteristic of a natural soil comprising:
  (a) providing a polymer solution, wherein said polymer comprises a microbial exopolysaccharide with chains of two residues of D-glucose, one L-rhamnose, and one D-glucuronic acid, and cross-linker solution, wherein said cross-linker solution comprises a divalent cation;
  (b) introducing droplets of said polymer solution into said cross-linker solution to form a plurality of hydrogel beads, wherein the hydrogel beads comprise water in an amount of more than about 98% by weight.

14. The method of claim 13 wherein said divalent cation is magnesium.

15. The method of claim 13, wherein said polymer solution comprises one or more polymers in an amount of about 0.4% to about 1.2% by weight of the solution.

16. The method of claim 13 wherein said exopolysaccharide is produced by *Sphingomonas elodea*.

17. The method of claim 13 wherein said exopolysaccharide is gellan.

18. The method of claim 13, wherein said polymer solution comprises gellan gum and alginate.

19. The method of claim 18, wherein the ratio of gellan gum to alginate is about 4:1.

20. The method of claim 13, wherein said crosslinking solution comprises $MgCl_2$.

21. The method of claim 20, wherein said $MgCl_2$ is at a concentration of from about 5 mmol/L to about 100 mmol/L.

22. The method of claim 13, wherein the cross-linker solution is stirred.

23. The method of claim 13, wherein said droplets are dropped through a needle.

24. The method of claim 23, wherein said needle has an inside diameter of from about 300 μm to about 2 mm.

25. The method of claim 13, further comprising soaking said plurality of hydrogel beads in an index-matching aqueous medium.

26. The method of claim 25, wherein the index-matching aqueous medium is a plant growth medium.

27. A method for in vivo root phenotyping comprising:
  a) growing a plant in the transparent soil of claim 1;
  b) providing an index-matching plant growth medium, wherein said transparent soil becomes transparent upon saturation with the plant growth medium;
  c) visualizing the root system of the plant.

28. The method of claim 27, wherein the visualizing is carried out using a device selected from a camera, a fluorescent microscope, a light microscope, or the like.

29. The method of claim 28, wherein said visualizing is under infrared light and without exposing the roots to biologically active visible radiation.

* * * * *